United States Patent [19]

Yamaguchi

[11] Patent Number: 5,101,314

[45] Date of Patent: Mar. 31, 1992

[54] PROTECTION SYSTEM FOR CAPACITOR BANK

[75] Inventor: Satarou Yamaguchi, Tokyo, Japan

[73] Assignee: Mitsubishi Denki Kabushiki Kaisha, Tokyo, Japan

[21] Appl. No.: 541,853

[22] Filed: Jun. 21, 1990

[51] Int. Cl.$^5$ ............................................. H02H 7/16
[52] U.S. Cl. ........................................ 361/15; 361/17
[58] Field of Search ................. 361/15, 16, 17; 324/51

[56] References Cited

U.S. PATENT DOCUMENTS 3,652,929  3/1972  Cushman ............................ 324/51

Primary Examiner—A. D. Pellinen
Assistant Examiner—S. Jackson
Attorney, Agent, or Firm—Rothwell, Figg, Ernst & Kurz

[57] ABSTRACT

In the protection system for a capacitor bank, a resistor is connected in series between a connection cable for connecting capacitor unit groups in parallel with one another and a short-circuit device provided for each capacitor unit group, by which a first short-circuit current flowing into a damaged capacitor unit from the other capacitor unit groups in a case of a short-circuit fault in the capacitor unit can be reduced and bypassed in safety, and, consequently, secondary accidents such as a fire followed by the short-circuit fault in the capacity unit can be prevented effectively.

1 Claim, 2 Drawing Sheets

PROTECTION SYSTEM FOR CAPACITOR BANK

BACKGROUND OF THE INVENTION

Field of the Invention

This invention relates to a protection system for a capacitor bank for low speed discharge.

Description of the Prior Art

FIG. 1 shows a protection system for a conventional capacitor bank of a large capacity, which is shown, for example, in the paper entitled "Protection System of Capacitor Bank for Low Speed Discharge and Method for Protecting Case Destruction" written by Kunio Kozuno and Kunichi Inoue, Proceedings of Seminar on Static Apparatus, the Institute of Electrical Engineers of Japan, (Dec. 12, 1980). In FIG. 1, reference numerals 1A, 1B, 1C, and 1D each are a capacitor unit, and particularly 1A shows a damaged capacitor. Reference numeral 2 is a coaxial cable for connecting the capacitor units 1A, 1B, 1C, and 1D in parallel with one another, 3 is a short-circuit device which, when a short-circuit (dielectric breakdown) occurs in one among a plurality of capacitor units connected in parallel with one another, short-circuits terminals of the damaged one, 4 is a lead wire, 10 is a switch for main discharge, and 11 is a load.

Next, the operation will be described. At first, in an ordinary capacitor bank for low speed discharge, capacitor units 1A, 1B, 1C, and 1D are connected in parallel with one another by the coaxial cables without using special decoupling elements. Accordingly, when short-circuit (dielectric breakdown) occurs in one capacitor unit 1A, energy stored in the other sound capacitor units concentrically flows into the damaged capacitor unit 1A, and cases and insulators of the capacitor units may be destroyed by an electromagnetic mechanical force acting on the cable due to the concentrated energy, bringing about danger of outflow of oil from the damaged capacitor unit 1A, ignition to oil, further a fire, and so forth.

In order to protect from the danger, it is necessary to electrically isolate the damaged capacitor unit 1A from the other capacitor units 1C and 1D before excessive energy flows into the damaged capacitor unit 1A or to short-circuit the damaged capacitor unit 1A with a low inductance circuit.

FIG. 1 shows an example, wherein the two capacitor units 1A and 1B are connected in parallel with each other, and a terminal of either of the capacitor units is connected via the short-circuit device 3 to the coaxial cable 2 for wiring. The short-circuit device 3 has a lead wire 4 connected thereto, and the other end of the lead wire 4 is connected to terminals on the opposite side of electrodes of the capacitor units 1A and 1B. The short-circuit device 3 comprises, for example, a thin aluminum foil and so forth, and is insulated from the side of the lead wire 4. When the capacitor units 1A and 1B operate normally, they are charged with predetermined energy. But, if short-circuit occurs, for example, in one capacitor unit 1A of the paired capacitor units, a large current flows into the damaged capacitor unit 1A from other capacitor units 1B to 1D. Since the greater part of the current concentrates upon a short-circuited part, the large current flows in a short time. Therefore, the aluminum foil of the short-circuit device 3 is vaporised explosively, breaking the insulating material, and the lead wire 4 on the outside is electrically connected to terminals on one side of the capacitor units 1A and 1B.

On the other hand, since a first short-circuit current $I_1$ flows into the damaged capacitor unit 1A, from the plurality of capacitor units connected in parallel with each other except the capacitor unit 1B paired with the damaged capacitor unit 1A, through the coaxial cable 2 for wiring, a circuit through which the current $I_1$ flows has a larger than the circuit of 1A and 1B capacitor. Accordingly, the current $I_1$ flows into later in time than the second short-circuit current $I_2$ which flows into the damaged capacitor unit 1A from the normal capacitor unit 1B paired with the damaged capacitor unit 1A and operates the short-circuit device 3. As described above, the first short-circuit current $I_1$ flows into the side of the lead wire 4 and does not flow into the damaged capacitor unit 1A. In other words, the first short-circuit current $I_1$, the large current is by-passed through the lead wire 4, to protect from a fire due to the damaged capacitor unit 1A.

Since a conventional protection system for a capacitor bank is constituted as described above, upon the occurrence of damage of a capacitor due to dielectric breakdown, an extremely large (a first) short-circuit current flows through the coaxial cable, so that cables, insulators and so forth may be destroyed by electromagnetic mechanical force. There is, therefore, a problem that a capacitor bank having a large capacity can not be constructed.

SUMMARY OF THE INVENTION

This invention is devised in order to solve such the problem as described above, and it is an object of this invention to provide a protection system for a capacitor bank from which is capable of protecting the capacitor bank from destruction due to electromagnetic mechanical force caused by a short-circuit current before anything happens by preventing a large short-circuit current from flowing through wirings of the capacitor bank in a case of a fault in the capacitor units.

In order to achieve the above-mentioned object, a protection system for a capacitor bank related to this invention has a resistor connected between a cable for connection and a short-circuit device in order to limit a first short-circuit current which flows into a damaged capacitor unit through the cable for connection from the other capacitor units connected in parallel in a case of a fault in the capacitor unit due to dielectric breakdown. The short-circuit device electrically connects a lead wire to one end of the capacitor unit by utilizing a second short-circuit current in the case of the fault in the capacitor units, thereby bypassing the first short-circuit current limited through the lead wire.

Incidentally, the above-mentioned and other objects and new features of this invention will be more perfectly clarified by reading the following detailed description with reference to accompanying drawings.

DESCRIPTION OF THE PREFERRED EMBODIMENT

Figure 1:
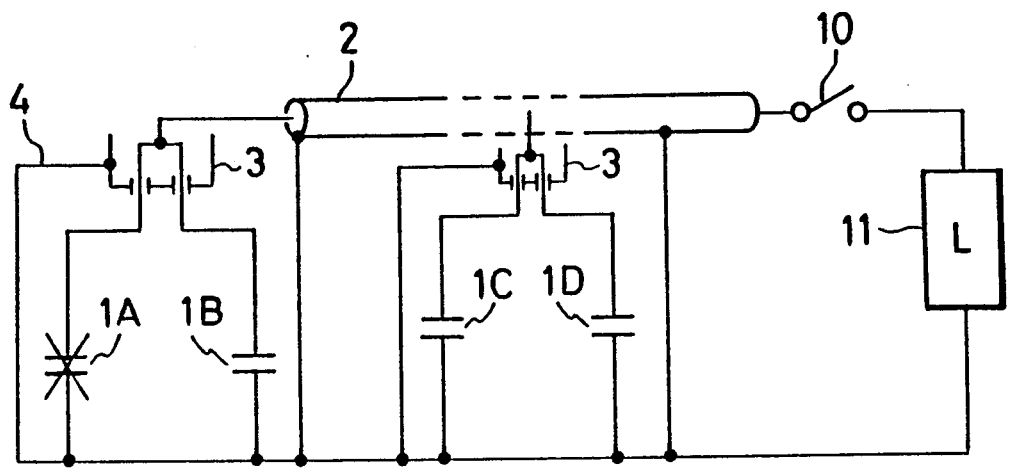
FIG. 1 is a block diagram showing a conventional protection system for a capacitor bank.
Figure 2:
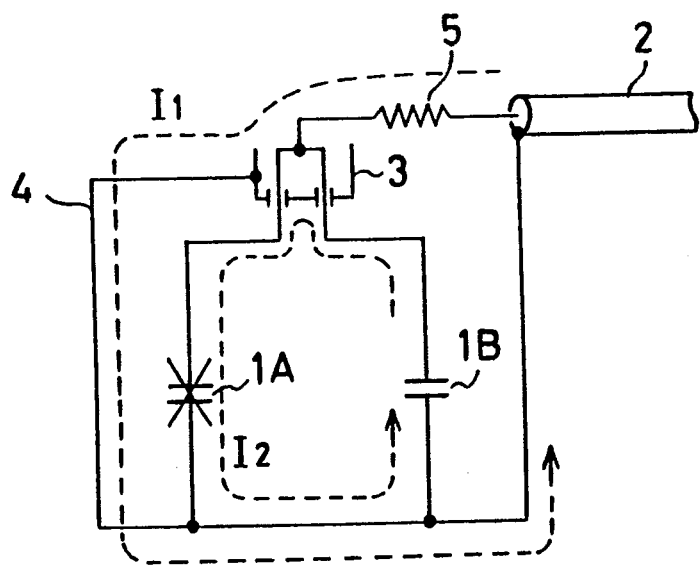
FIG. 2 is a block diagram showing a protection system for a capacitor bank according to an embodiment of this invention.

Hereinafter, an embodiment according to this invention will be described in reference to the drawings. In FIG. 2 in which the same parts as those in FIG. 1 are identified by the same numerals, reference numeral 4 is a lead wire connected to a short-circuit device 3, and 5 is a resistor of which one end is connected to other capacitor units connected in parallel with one another through a coaxial cable 2 for wiring and the other end of which is connected to terminals of capacitor units 1A and 1B on the side of the short-circuit device 3.

Figure 3:
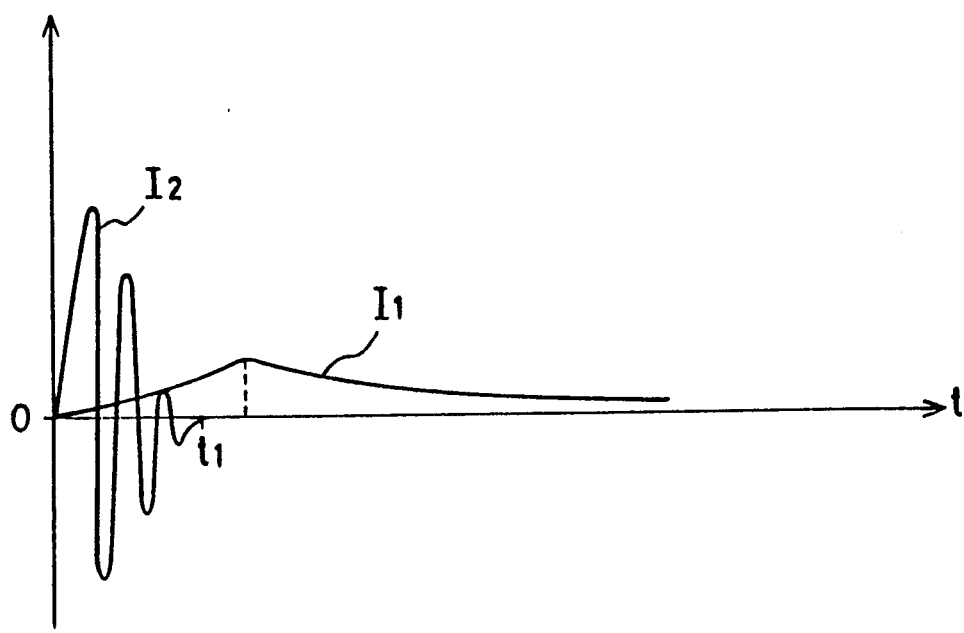
FIG. 3 is a waveform diagram showing short-circuit currents in a case of a fault in a capacitor unit shown in FIG. 2.

Next, the operation will be described. At first, it is assumed that the capacitor unit 1A shown in FIG. 2 is deteriorated in insulation, its withstanding voltage is lowered, and its leakage current is increased, resulting in self-explosion. Since energy stored in the capacitor unit 1A is not so large as a fire is brought about by dielectric breakdown, serious damage is not brought out. In addition, an excessive second short-circuit current $I_2$ flows into the capacitor unit 1A which has self-exploded from the other capacitor unit 1B connected in parallel with the capacitor unit 1A. FIG. 3 shows a diagram of a characteristic model, that is, shows the second short-circuit current $I_2$ flowing through the short-circuit device 3. The reason that the second short-circuit current $I_2$ becomes large is that the impedance of the current path is very low. The oscillation frequency at that time is also high.

As the result of a short-circuit fault in this capacitor unit 1A, the short-circuit device 3 operates and the lead wire 4 short-circuit both ends of the capacitor units 1A and 1B at the time $t_1$. Because of the capacitor units 1A and 1B being short-circuited, a current from other capacitor units does not flow into the self-exploded capacitor unit but flows into the lead wire 4 via the resistor 5. Since the first short-circuit current $I_1$ via the resistor 5 is decreased by the resistor 5, it does not become large, and consequently it does not induce a fire due to oil and so forth. The above-mentioned first short-circuit current $I_1$ increases slower in amplitude than the second short-circuit current $I_2$ does because an inductance of wirings (including the coaxial cable 2) is large. In addition, the maximum current value of the first short-circuit current $I_1$ can be suppressed to a low value. Accordingly, since an electromagnetic force which acts on the wiring system is subjected to a sharp reduction (an electromagnetic force is proportional to the square of a current value), the soundness (protection coordination) of capacitor bank facilities is ensured.

Figure 4:
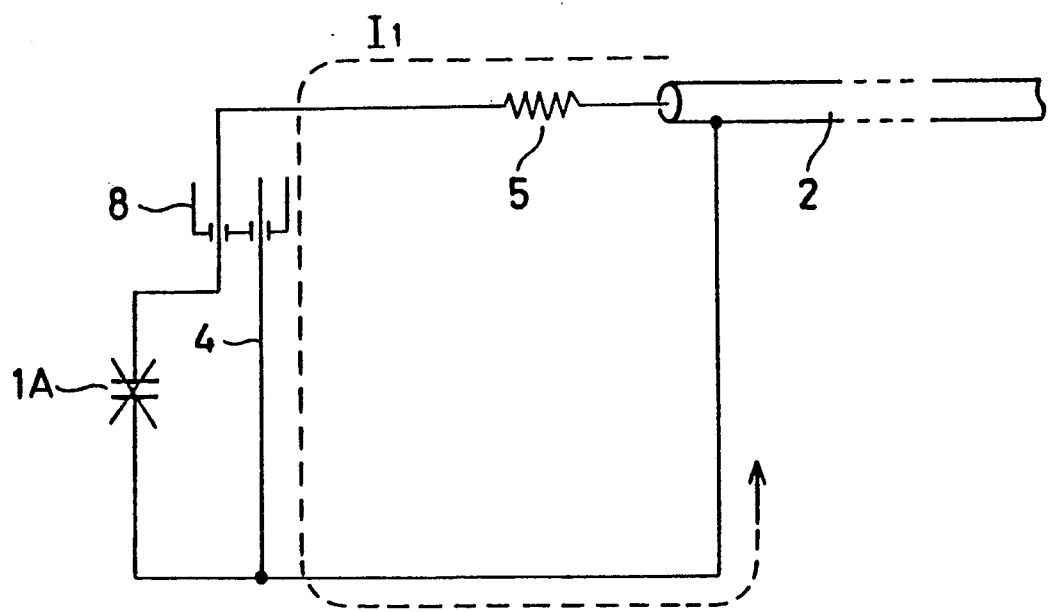
FIG. 4 is a block diagram showing a protection system for a capacitor bank according to another embodiment of this invention, in which a short-circuit device is provided for an individual capacitor unit.

Though there is described the capacitor bank in which the both of the capacitor units 1A and 1B utilize one short-circuit device 3, the capacity bank may be arranged in such a manner that one short-circuit device 3 is provided for one capacitor unit as shown in FIG. 4, and it produces the same effect as the above-mentioned embodiment.

Each short-circuit device 3 is connected to one resistor 5 in FIGS. 2 and 4, so two or one capacitor units are connected to one resistor. But it is also available that one resistor 5 can be connected to more capacitor units.

As described above, according to this invention, since, in a case of a capacitor fault, the lead wire for bypassing the short-circuit current is connected to the short-circuit device and one end of the capacitor is connected via the resistor to the coaxial cable, a fire due to oil in the damaged capacitor unit can be prevented, and occurrence of secondary accidents such as damage of insulators due to the electromagnetic mechanical force and explosion of lead portions of the sound capacitor units can be also suppressed, whereby protection coordination for a capacitor bank system can be attained and a large scale capacitor bank can be designed and manufactured with high reliability.

What is claimed is:

1. A protection system for providing short-circuit protection for a capacitor bank of large capacity in which a plurality of capacitors are connected in parallel with each other for storing electrical energy therein comprising:
   a plurality of capacitor unit groups, at least one of said capacitor unit groups having at least one capacitor unit;
   a connection cable for connecting said plurality of capacitor unit groups in parallel with one another;
   a short circuit device, provided for said at least one capacitor unit group and responsive to a short-circuit fault in said at least one capacitor unit of said at least one capacitor unit group, for bypassing a first short circuit current flowing into said at least one capacitor unit in the event of a short-circuit therein when electrical energy is stored in said capacitor unit groups; and
   a resistor, connected in series between said connection cable and said short-circuit device, for limiting said first short-circuit current flowing into said at least one capacitor unit group from said plurality of said capacitor unit groups other than said at least one capacitor unit group.

* * * * *

UNITED STATES PATENT AND TRADEMARK OFFICE
CERTIFICATE OF CORRECTION

PATENT NO. : 5,101,314

DATED : March 31, 1992

INVENTOR(S) : Satarou Yamaguchi

It is certified that error appears in the above-identified patent and that said Letters Patent is hereby corrected as shown below:

Column 2, line 8, delete "into".

Column 2, line 34, delete "from".

Signed and Sealed this

Seventh Day of September, 1993

Attest:

BRUCE LEHMAN

*Attesting Officer*        *Commissioner of Patents and Trademarks*